US010970297B2

(12) United States Patent
Mangan, III et al.

(10) Patent No.: US 10,970,297 B2
(45) Date of Patent: Apr. 6, 2021

(54) REMOTE PROCESSING OF MEMORY AND FILES RESIDING ON ENDPOINT COMPUTING DEVICES FROM A CENTRALIZED DEVICE

(71) Applicant: Heureka, Inc., Cleveland, OH (US)

(72) Inventors: Martin Mangan, III, Parma, OH (US); Daniel Carl, Cleveland, OH (US); Ronald K. Copfer, Cleveland, OH (US); Bradford Henry Hegrat, Montville, OH (US); Nathaniel H. Latessa, Willoughby, OH (US)

(73) Assignee: Heureka, Inc., Cleveland, OH (US)

( * ) Notice: Subject to any disclaimer, the term of this patent is extended or adjusted under 35 U.S.C. 154(b) by 0 days.

(21) Appl. No.: 15/013,351

(22) Filed: Feb. 2, 2016

(65) Prior Publication Data
US 2016/0154864 A1 Jun. 2, 2016

Related U.S. Application Data

(63) Continuation-in-part of application No. 14/679,467, filed on Apr. 6, 2015, now abandoned.
(Continued)

(51) Int. Cl.
G06F 16/22 (2019.01)
G06F 16/95 (2019.01)
(Continued)

(52) U.S. Cl.
CPC ........ G06F 16/248 (2019.01); G06F 16/2228 (2019.01); G06F 16/951 (2019.01); G06Q 10/06 (2013.01); H04L 67/2833 (2013.01)

(58) Field of Classification Search
CPC ......... G06F 17/30554; G06F 17/30864; G06F 17/30321; H04L 67/40
(Continued)

(56) References Cited

U.S. PATENT DOCUMENTS 7,370,035 B2   5/2008   Gross et al.
7,424,510 B2   9/2008   Gross et al.
(Continued)

FOREIGN PATENT DOCUMENTS

WO          0143031 A1      6/2001
WO    WO 2014018089 A1 *   1/2014   ............ G06Q 10/08
WO    WO-2014018089 A1 *   1/2014   ............ G06Q 10/08

OTHER PUBLICATIONS

Written Opinion for PCT Patent Application No. PCT/US2015/024608, dated Jul. 9, 2015, 5 pages.
(Continued)

Primary Examiner — Mohammad S Rostami
Assistant Examiner — Robert F May
(74) Attorney, Agent, or Firm — Ulmer & Berne LLP

(57) ABSTRACT

System and methods are provided for identifying, searching, collecting, locking, executing deleting, comparing and/or analyzing data from a plurality of computer devices and environments from a centralized interface. The endpoint computer devices utilize an agent to index data contained on each device and that allows for a distributed action model using simple or advanced analytics by authenticated users. The agent can be embedded in an integrated circuit of the endpoint computing device or otherwise stored in permanent read only memory (i.e., firmware). The system allows for one or more users to conduct actions via device indexes utilizing a centralized computing device for comparison and analyzation purposes.

19 Claims, 12 Drawing Sheets

Related U.S. Application Data

(60) Provisional application No. 61/975,955, filed on Apr. 7, 2014.

(51) Int. Cl.
   *G06F 16/248* (2019.01)
   *G06F 16/951* (2019.01)
   *H04L 29/08* (2006.01)
   *G06Q 10/06* (2012.01)

(58) Field of Classification Search
   USPC .......................................................... 707/722
   See application file for complete search history.

(56) References Cited

U.S. PATENT DOCUMENTS

| | | | |
|---|---|---|---|
| 7,496,559 B2 | 2/2009 | Gross et al. | |
| 7,945,914 B2 | 5/2011 | Hasiuk et al. | |
| 8,019,741 B2 | 9/2011 | Gross et al. | |
| 8,498,977 B2 | 7/2013 | Gross et al. | |
| 8,671,087 B2 | 3/2014 | Wills et al. | |
| 8,856,093 B2 * | 10/2014 | Gross | G06F 16/90344 707/705 |
| 2005/0257045 A1 | 11/2005 | Bushman et al. | |
| 2006/0149795 A1 * | 7/2006 | Gillespie | G06Q 10/10 |
| 2007/0021982 A1 * | 1/2007 | Sun | G06Q 10/06 705/2 |
| 2007/0203910 A1 * | 8/2007 | Ferguson | G06F 16/27 |
| 2007/0220614 A1 * | 9/2007 | Ellis | G06F 21/6245 726/27 |
| 2008/0021881 A1 * | 1/2008 | Subramaniam | G06F 16/951 |
| 2008/0033943 A1 * | 2/2008 | Richards | G06F 16/313 |
| 2008/0263032 A1 * | 10/2008 | Vailaya | G06F 16/334 |
| 2010/0088370 A1 | 4/2010 | Wu et al. | |
| 2012/0089585 A1 * | 4/2012 | Rose | G06Q 30/02 707/706 |
| 2013/0036154 A1 * | 2/2013 | Chhaparia | G06F 16/9562 709/202 |
| 2013/0198233 A1 * | 8/2013 | Jacobson | G06F 16/25 707/774 |
| 2014/0143538 A1 * | 5/2014 | Lindteigen | H04L 63/123 713/156 |

OTHER PUBLICATIONS

International Search Report for PCT Patent Application No. PCT/US2015/024608, dated Jul. 9, 2015, 3 pages.

Multhaler, Evelyn; Supplementary European Search Report; issued in EP App. No. EP 15 77 6182; search completed on Oct. 3, 2017; 2 pages.

European Search Opinion; issued in EP App. No. EP 15 77 6182; dated Oct. 13, 2017; 3 pages.

International Search Report; issued in PCT/US2015/025608; dated Jul. 9, 2015; 2 pages.

* cited by examiner

REMOTE PROCESSING OF MEMORY AND FILES RESIDING ON ENDPOINT COMPUTING DEVICES FROM A CENTRALIZED DEVICE

CROSS-REFERENCE TO RELATED APPLICATION

This application is a continuation-in-part of prior application U.S. patent application Ser. No. 14/679,467, entitled "REMOTE PROCESSING OF MEMORY AND FILES RESIDING ON ENDPOINT COMPUTING DEVICES FROM A CENTRALIZED DEVICE," filed on Apr. 6, 2015, which claims priority to the disclosure of U.S. Provisional Patent Application Ser. No. 61/975,955, entitled "REMOTE RETRIEVAL AND PROCESSING OF ELECTRONICALLY STORED INFORMATION," filed Apr. 7, 2014, the disclosures of which are all incorporated herein by reference in their entirety.

BACKGROUND OF THE INVENTION

Locating important or business-relevant unstructured data that resides on endpoint devices continues to be problematic for organizations with any significant information technology infrastructure. Personal identifiable information in view of the Payment Card Industry Data Security Standard (PCI DSS), protected health information for the Administrative Simplification provisions of the Health Insurance Portability and Accountability Act (HIPAA) regulations, documents and emails for litigation or regulatory purposes, comparing laboratory research results with known published articles, resident malware that poses malicious threats of hacking and even responses to Freedom of Information Requests (FOIA) by government agencies plague even the most advanced information technology professional. As data growth expands exponentially, the issues related to identifying, collecting, and moving or deleting unstructured or semi-structured electronically stored information (ESI) will continue to challenge even the most sophisticated organizations, with examples including: malware, malicious software, worms, rootkits, backdoors, Trojan horses, botnets, ransomware, adware and scareware and other malicious software. Once malware is installed on a system, it is essential that it keep itself concealed to avoid detection, even going into a "dormant" stage until needed. Typical approaches to finding, identifying and removing malware from endpoint computing devices are manually intensive and often requiring large amounts of human intervention.

The identification of data and its contents on endpoint computing devices from a centralized location will continue to be an invaluable process as organizations evolve. Presently, there exists no invention that can completely automate the identification of important endpoint data. Additionally, aggregating data to process and extract value from it is taxing the best computer hardware processing methods available. As well, applying standardized big data processing technologies to extract business or other intelligence from data currently requires the replication of all the data desired for processing, further exacerbating the issue of growth of the data volume.

Although there are many forms of technology that can identify processes, routines, sub-routines and communications via agents to specific bytestreams from endpoint computing devices or that copy memory and file information from endpoint computing devices to a centralized location, there presently exists no technology that does this by allowing the endpoint computing device to communicate what resides on it by way of a local index of bytestream level content that is stored directly on the end point device itself. There currently exists technology that can identify, collect and process ESI from endpoint computers by way of transfer to third party storage mediums, centralized computing devices, USB hardware and cloud or Internet-based storage locations to analyze and report. These processes increasingly take longer, require manual intervention and excessive processing as well as induce local, wide-area and Internet transport medium bottlenecks for network administrators.

Accordingly, there exists a need in the art for identifying ESI by file and memory contents from endpoint computing device that overcomes the aforementioned deficiencies by utilizing a local or cloud-based index of data that contains the file and memory information from an endpoint computing device and that can be searched from a central location. By distributing the processing for ESI content on endpoint computing devices by way of a local index on or from each, to a centralized search location, one can drastically reduce the costs and time to find data that is relevant to business needs and requirements.

BRIEF DESCRIPTION OF THE DRAWINGS

It is believed that certain embodiments will be better understood from the following description taken in conjunction with the accompanying drawings, in which like references indicate similar elements and in which.

DETAILED DESCRIPTION

Figure 1:
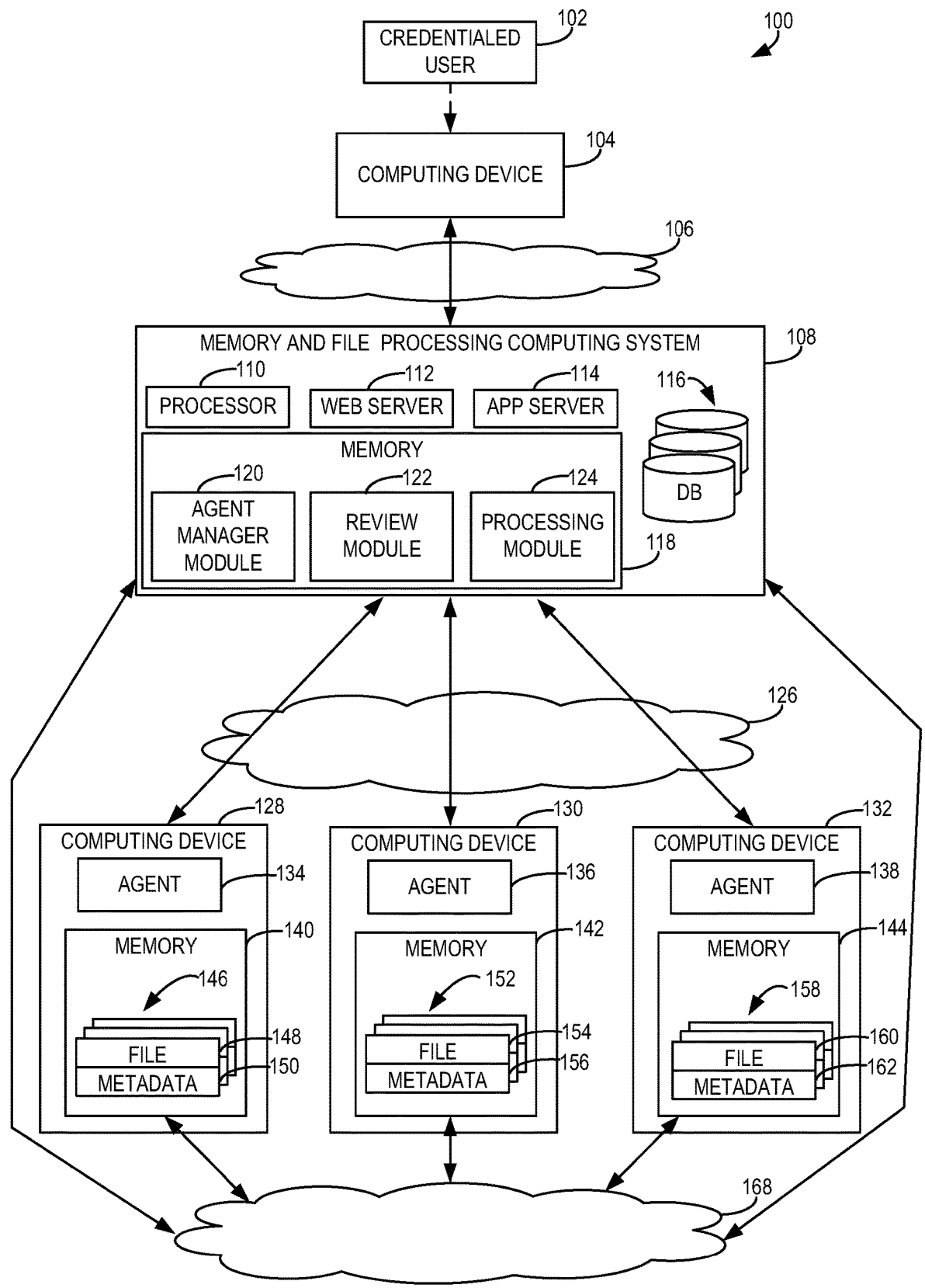
FIG. 1 depicts an example block diagram of an example memory and file processing computing system in communication with a variety of computing devices either on a local network, private wide area network or across the Internet.

Various non-limiting embodiments of the present disclosure will now be described to provide an overall understanding of the principles of the structure, function, and use of systems, apparatuses, devices, and methods disclosed herein for the location of specific bytestreams on endpoint computing devices. One or more examples of these non-limiting embodiments are illustrated in the selected examples disclosed and described in detail with reference made to FIGS. 1-9 in the accompanying drawings. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Further, while the present disclosure is described largely in the context of locating specific bytestreams on distributed computer systems, it is to be appreciated that the systems, apparatuses, devices, and methods described herein can be utilized in a variety of contexts in which locating detailed metadata about those bytestreams residing on any one or more computing devices from one or more remote computing devices may be desirable. In this regard, the systems, apparatuses, devices, and methods described herein can be used by any entity to identify and locate memory and file system data, including file meta-data from any suitable endpoint device. As used herein, endpoint computing devices (sometimes referred to as computing devices) can include, without limitation, stand-alone devices, such as external storage devices, networked devices on the same infrastructure as the central command computing system or various computing devices on different networks, but accessible through public and/or private networks and/or communication protocols. Endpoint computing devices in accordance with the present disclosure can also include non-traditional components not necessarily considered part of an enterprise network such as various embedded applications, SAN/NAS storage devices, USB devices, industrial control system components and subcomponents, automobiles, tractors or other vehicles, maritime and aviation shipping, tracking and logistics, as well as encompassing wearable devices, the Internet of Things (IoT) and the Industrial Internet of Things (IIoT), for example. Implementations can include, without limitation, use by an employer or provider to locate specific bytestreams from various enterprise computing devices including desktop and laptop computers, mobile devices such as smartphones and tablets and infrastructure devices such as servers, routers, firewalls and various other embedded hardware and associated applications, such as those listed above.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated by those of ordinary skill in the art that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "bytestream," "information," "memory," "file" or "files" and "data" are used expansively and includes a wide variety of electronic information, including executable code; content such as text, video data, images and audio data, among others; and various codes, meta-data, system logs, or flags or any other electronically stored information that resides on a computing device. The terms "bytestream," "ESI," "information," "data," "meta-data," "system data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, cloud and cloud distributed systems, and can or may use other protocols, or operate at other layers in communication protocol stacks, than are described.

When traditional forensic investigation has identified that a particular or a set of particular malware and or its components exist inside a protected information technology system or systems, organizations typically need to create an image of individual endpoint computing devices with a bit-copy forensic examination software application, or copy some or all of the content of an endpoint computing device to a centralized location, search the copies for the cryptographic hash or name of the known malware. For remediation, it is often necessary to reinstall the endpoint computing device operating system, if infected or suspected to be infected, and replace the copied files without the identified malware. With a multitude of mobile devices, laptops, desktops, servers, and various other storage systems, organizations may have thousands if not tens of thousands of endpoint computing devices to search for the presence of identified malware, the present disclosure generally provides an organization or affiliated entity with robust and automated discovery of endpoint location capability.

Electronically Stored Information (ESI) that resides within corporate organizations is mostly comprised of semi-structured and unstructured data (i.e., information that does not reside in a database). To find relevant ESI via bytestream, it can be indexed at the hardware device level so that it can be searched efficiently. At present, the typical organization process for collecting potential evidence is to send a forensic technician to a user's device(s) and remove it or otherwise control it for a length of time while it is bit-copied, thereby creating an exact duplicate of the contents of that device. Using this typical approach, if a user has a 500 GB hard drive with 280 GB of ESI on it, all 280 GB's of ESI would be captured, exported, imported into a processing tool, culled, exported again and then imported into a review or analysis tool to search and produce any relevant information. As users' devices and hard drives continue to increase in number, in volume, and with the advance of technology, these traditional techniques for collecting ESI will also be more laborious and costly. No matter what size of hard drive, however, any particular computing device may only have a relatively limited amount of ESI, if any at all, that is deemed relevant to a query. Nevertheless, using current techniques, organizations must still typically identify, retrieve, process and review all of information on each device to ascertain if any of it is relevant to an investigation.

Aspects of the present disclosure generally allow for the remote identification, filtering, collection, deletion and distributed processing of ESI through network communications with a hardware or software agent installed or otherwise embedded in an endpoint computing device. ESI that is resident on the endpoint computing device and that is deemed potentially relevant or positive to a query can be selectively collected and processed or be individually targeted for copying, deletion or remediation. As is to be appreciated, this approach can reduce the cost of the collection of ESI or the remediation of malware as compared to traditional techniques and can provide a quicker view of the relevant data and any computing devices that contain malware on a quicker time-table, utilizing fewer resources. Example embodiments of the systems, apparatuses, devices, and methods described herein can generally transform unstructured or semi-structured ESI from an endpoint computing device into a usable structured form for the purpose of identifying ESI, enumerating general bytestreams and remediating malware by way of an agent managing a local index of all file system objects on the endpoint computing device. Using a centralized command computing system and agents executing on endpoint computing devices, described in more detail below, ESI, general bytestreams and malware can be identified, collected and/or deleted and processed without the need for an exact duplicate copy of the hard drive of the computing device to be removed from the site, or otherwise bit-copied or transferred by networks. As is to be appreciated by those skilled in the art, the identification of files or data that can be used for litigation or malicious purpose can be used for any other desirable purpose.

As described in more detail below, an agent can either be embedded in various computing devices, such as solid state drives, hard disk drives, storage controllers (i.e. SATA/PCIe/RAID, etc.), network-attached storage (NAS), storage area network (SAN) solutions, etc. Additionally or alternatively an agent can be downloaded and either manually or automatically installed on a computing device, such as a user's local machine, a laptop, a desktop unit, a mobile computing device, a gaming device, a server, a document repository, or any other suitable device having a network connection either permanently or intermittently/rarely. After installation and depending on deployment type, the agent can either run as a series of drivers or can be run as a service, daemon, or other interface(s) and build an index of the entire storage content (ESI or memory and files) of that endpoint computing device. Indexes can be stored locally, in any available location, if there is room for such storage or be located in a centralized storage device on the Internet, for example. Once the index is built by the agent, the agent can then be queried remotely, such as by a non-technical staff, in order to identify ESI, memory, files and other bytestreams that are relevant to a particular query.

Agents generated in accordance with present disclosure can be installed concurrently on any number of computing devices, such as hundreds, thousands, or an unlimited number of dispersed computing devices. The processing power of these individual assets, machines, systems and subsystems is utilized to index the contents on each machine and subsequently used by a memory and file central command computing system to unify, contextualize and correlate data and information to render intelligence via single and recursive queries in a manner and scale to address the technological inadequacies of current processing techniques, as described above. In some embodiments, after an initial query, identified ESI or malware or other bytestreams resident on the endpoint computing device can be collected (i.e. electronically transmitted from the computing device to the central command computing system over a network) and preserved for litigation or investigation purposes, or otherwise deleted.

The memory and file processing computing systems in accordance with the present disclosure can be cloud-based, application-based, or can be installed on-site on a computing device, for example. In some embodiments, the memory and file processing computing system can be a distributed system, with some components installed on-site (i.e., on the same local network as computing devices with dispatched agents) and other components operating in a cloud-based infrastructure. In any event, through the utilization of agents as described herein, the ESI collection, malware and bytestream location identification process is automated to reduce data collection sizes, reduce possible manual searching of endpoint computing devices and reduce the resultant costs associated with processing over-collected data sets from more devices than necessary to eradicate malware in an entire environment or to find other relevant bytestreams and ESI.

FIG. 1 depicts an example block diagram 100 of an example memory and file processing computing system 108 in communication with a variety of endpoint computing devices. A credentialed user 102 can interact with a computing device 104 to access the memory and file processing computing system 108. The credentialed user 102, can be, for example, affiliated with a corporation that is collecting ESI for discovery purposes or attempting to locate malware resident on an endpoint computing device. The user 102 can interact with the memory and file processing computing system 108 over a network 106 through a web-based portal, a specialized application executing on the computing device 104, or through any other suitable communication protocols. The network 106 can be either a public or private network, and be a wired network, wireless network, or combination thereof. As is to be appreciated by those skilled in the art, networks, whether wired or wireless and the files transmitted thereupon may be encrypted in any manner required for the application. The credentials of the credentialed user 102 can be used by the memory and file processing computing system 108 to identify the user 102 and establish which data the user 102 may access.

The memory and file processing computing system 108 can be in communication with one or more networks 106, 126, 168. The memory and file processing computing system 108 can be provided using any suitable processor-based device or system, such as a personal computer, laptop, server, mainframe, mobile or other processor-based device, or a collection (e.g. network) of multiple computers, for example. The memory and file processing computing system 108 can include one or more processors and one or more memory units. For convenience, only one processor 110 and only one memory unit 118 are shown in FIG. 1. The processor 110 can execute software instructions stored on the memory unit 118. The processor 110 can be implemented as an integrated circuit (IC) having one or multiple cores. The memory unit 118 can include volatile and/or non-volatile memory units. Volatile memory units can include random access memory (RAM), for example. Non-volatile memory units can include read-only memory (ROM) as well as mechanical non-volatile memory systems, such as a hard disk drive, optical disk drive, or other non-volatile memory. The RAM and/or ROM memory units can be implemented as discrete memory ICs.

The memory unit 118 can store executable software and data for an agent manager module 120, a review module 122, and a memory and file processing module 124, for example. When the processor 110 of the memory and file processing computing system 108 executes the software instructions of various modules, the processor 110 can be caused to perform the various operations of the memory and file processing computing system 108. The various operations of the memory and file processing computing system 108 can include communicating with the computing device 104, communicating with computing devices 128, 130, 132 via the agents 134, 136, 138, respectively, receiving memory and file information, processing memory and file information, and facilitating review of the memory and file information, as described in more detail below.

The memory and file processing computing system 108 can store and access data in a variety of databases 116. The data stored in the databases 116 can be stored in a non-volatile computer memory, such as a hard disk drive, read only memory (e.g. a ROM IC), or other types of non-volatile memory. In some embodiments, one or more databases of the databases 116 can be stored on a remote electronic computer system and can be accessed by the memory and file processing computing system 108 via a network. As one having ordinary skill in the art would appreciate, a variety of other databases or other types of memory storage structures can be utilized or otherwise associated with the memory and file processing computing system 108.

Also shown in FIG. 1, the memory and file processing computing system 108 can include one or more computer servers, which can include one or more web servers, one or more application servers, and/or other types of servers. For convenience, only one web server 112 and one application server 114 are depicted in FIG. 1, although one having ordinary skill in the art would appreciate that the disclosure is not so limited. The servers 112,114 can cause content to be sent to the computing device 104 of the credentialed user 102, described in more detail below, via the network 106 in any of a number of formats. The servers 112, 114 can be comprised of processors (e.g. CPUs), memory units (e.g. RAM, ROM), non-volatile storage systems (e.g. hard disk drive systems), and other elements. The servers 112, 114 may utilize one or more operating systems including, but not limited to, Solaris, Linux, Windows Server, OSx or other server operating systems.

In some embodiments, the web server 112 can provide a graphical web user interface through which various users can interact with the memory and file processing computing system 108. The graphical web user interface can also be referred to as a graphical user interface, client portal, client interface, graphical client interface, and so forth. The web server 112 can accept requests, such as HTTPS requests, from clients and serve the clients responses, such as HTTPS responses, along with optional data content, such as web pages (e.g. HTML documents) and linked objects (such as images, video, documents, data, and so forth). The application server 114 can provide a user interface for users who do not communicate with the memory and file processing computing system 108 using a web browser. Such users can have special software installed on their computing device 104 to allow the user to communicate with the application server 114 via the network 106.

The memory and file processing computing system 108 can be in communication with agents 134, 136, 138 that are resident on computing devices 128, 130, 132, respectively, via the network 126. Each of the agents 134, 136, 138 can be software-based, hardware-based, and/or embedded in firmware, as may depend on the type of computing devices associated therewith. The network 126 can be an electronic communications network and can include, but is not limited to, the Internet, LANs, WANs, GPRS networks, other networks, or combinations thereof. The network 126 can include wired, wireless, fiber optic, other connections, the Internet, 168 or combinations thereof. In general, the network 126, 168 can be any combination of connections and protocols that will support communications between the memory and file processing computing system 108 and the agents 134, 136, 138. Data communicated via the network 126 can be of various formats and can include, for example, textual, images, video, audio, written language, other formats or combinations thereof. The nature of data and messages communicated via the network 126 will be discussed in further detail in association with other exemplary embodiments.

While three computing devices 128, 130, 132 are illustrated in FIG. 1, any suitable number of computing devices can be affiliated with the memory and file processing computing system 108. In the context of a litigation or malware identification investigation, the number of computing devices to which agents are dispatched and installed can depend on the number of employees that may have relevant ESI or malware resident in their computing device. In other contexts, a corporation may decide to install an agent on every endpoint computing device on the corporate network or on select endpoint computing devices. Larger, endpoint computing devices such as file servers or email servers might have multiple agents based in hardware, software, and/or firmware installed on a single device with their accompanying indexes maintained separately or combined. Each of the computing devices 128, 130, 132 can be any type of computer device suitable for communication over the network 126. Examples include, without limitation, laptop computers, desktop computers, tablet computers, personal digital assistants, vehicles, flying machines, wearable computing devices, smartphones (combination telephone and handheld computer), storage devices/systems, or other suitable computing devices such as a mobile gaming devices, media players, servers or other network components, file management systems, and so forth. In some embodiments, the agent installed on the computing device, shown as agents 134, 136, 138, can run as a service that is largely transparent to the user of the computing device. In some embodiments, a corporation can optionally install agents on various computing devices 128, 130, 132 without the user of the computing device 128, 130, 132 necessarily being aware of the installation and ongoing operation of the agent. In other implementations, the user of the computing device can assist with the installation of the agent, such as by actively downloading and installing the appropriate software or may be provided as part of the hardware solution therein. In any event, once the agent is executing on the computing device (sometimes referred to as a local computing device, an endpoint computing device, remote computing device, storage device, or external storage device, or storage solution), the agent can perform some, if not all, of its functions without input from the user of the computing device. Instead, messaging received from the memory and file processing computing system 108 can be used to check the status of the agent and control the functionality of the agent.

Figure 1A:
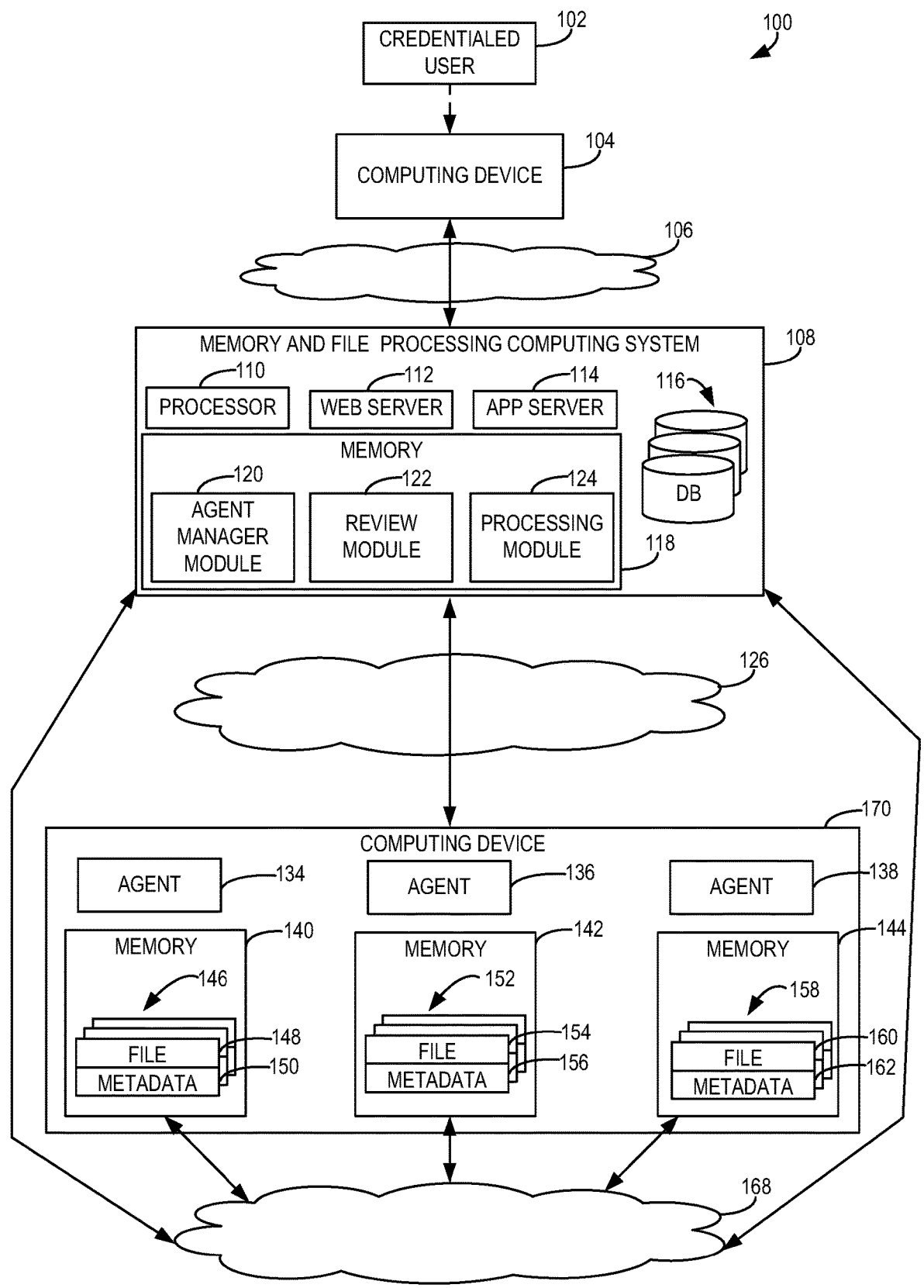
FIG. 1A depicts an example block diagram of an example memory and file processing computing system in communication with a computing device.

Moreover, while one agent per computing devices is schematically illustrated in FIG. 1, this disclosure is not so limited. FIG. 1A, for example, schematically depicts agents 134, 136, 138 associated with a single endpoint device, shown as computing device 170.

Referring again to FIG. 1, each computing device 128, 130, 132 can have associated memory, schematically illustrated as memory 140, 142, 144. As is known in the art, memory and file data 146, 152, 158 can be stored in the memory 140, 142, 144. Some memory and file data include files 148, 154, 160 (such Word documents, email messages, and so forth) the electronic contents of such files and associated metadata 150, 156, 162 (such as creation date, file owner, last edit data, and so forth). The memory and file data 146, 152, 158 can include structured, semi-structured and unstructured data. Upon deployment of the agents 134, 136, 138, the agent can be configured to create a searchable index of the contents of the memory and file data 146, 152, 158. The index can therefore be generated utilizing the processing resource of the local computing device. In some embodiments, this indexing is performed as a background routine which can be executed without any input from a user of the local computing device. The agent 134, 136, 138 can update the index over time as more memory and file data 146, 152, 158 is generated, as well as track the status of indexed ESI (i.e., track modifications, deletions, transfers, etc.). The memory indexes created 140, 142, 144 can be located in various locations on the specific computing device it is read from or stored to a cloud or Internet location, 168.

As described in more detail below (FIGS. 5-8, for example), once the indexes of ESI content are built on or from the local endpoint computing devices, the agents can communicate with the agent manager module 120 to confirm they are ready to accept queries. The credentialed user 102 can then interact with the memory and file processing computing system 108 via their computing device 104. Through this interaction, queries can be submitted to one of more agents 134, 136, 138 or to the index representation associated to the agents in the cloud, 168. Such queries can be any suitable type of query, such as using keywords, time parameters, file parameters, predictive coding, conceptual search, Boolean expressions, natural language processing (NLP) queries and so forth. The agent manager module 120 can provide the query to one or more (including all) of the agents 134, 136, 138. If any of the computing devices 128, 130, 132 are off-line at the time of the query, the query can be queued for transmission at a later point in time. Upon receiving the query, the agents 134, 136, 138 can query its index to identify any memory and file data 146, 152, 158 that satisfies the query (such memory and file data may be referred to as "identified ESI or malware", which is a subset of the data stored locally on the device). The results of this identification step can then be provided by each agent 134, 136, 138 to the memory and file processing computing system 108. In some embodiments, copies of the identified memory and file data are provided to the memory and file processing computing system 108 over the network connection. In other embodiments, a two-step identification and collection process is used. First a representation of identified memory and file data is provided to the memory and file processing computing system 108 by the agent. This identification can be provided in any suitable formant, such as a number of "hits", or other quantification, such as file size, type, name or cryptographic hash identification. The identified memory and file data can also be summarized for each of interpretation by the credentialed user. For instance, the identified memory and file data can be segmented into number of hits for a variety of different file types (i.e., "50 email messages, 135 WORD documents, 23 POWERPOINT files"), file names or any one or more cryptographic hash identifiers for comparison. Depending on the identified memory and file data, the credentialed user 102 can then determine to perform a refined/different query or to initiate a collection of the identified memory and file data or the deletion of identified memory and file data.

Once a collection command is received from the credentialed user 102, the memory and file processing computing system 108 retrieves copies of the identified memory and file data and stores them in the databases 116 for subsequent review by the credentialed user 102. As the identified memory and file data is received by the memory and file processing computing system 108, the memory and file processing module 124 can perform various processing, such as data de-duplication, deNISTing, tagging, filtering, classification, categorization and so forth. Once a deletion command is received from the credentialed user 102, the memory and file processing computing system 108 commands the agents 134, 136, 138 on the endpoint computing device 128 to utilize system resources to delete the memory 140, 142, 144 or file 146, 152, and 158. The memory and file processing module 124 can also confirm that all the "hits" previously identified were successfully collected or deleted. If any computing device is off-line when any of the identify, collect or delete commands are dispatched, the command can be queued until a later point in time. Once the identified memory and file data has been collected and processed, the review module 122 can facilitate review of the material by the credentialed user 102, or other suitable reviewer or investigator.

Figure 2:
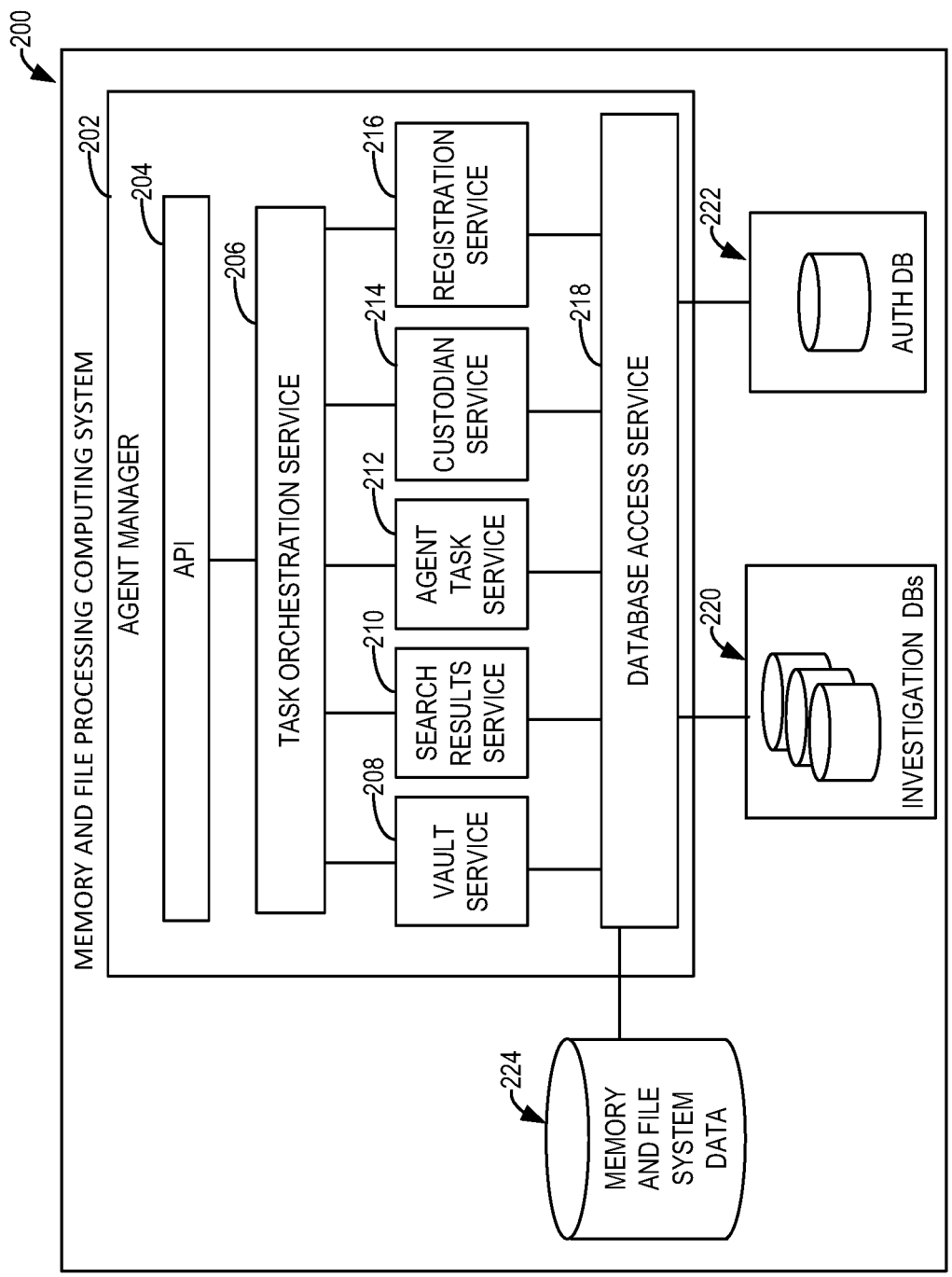
FIG. 2 depicts an example block diagram of a memory and file processing computing system having an agent manager.

FIG. 2 depicts an example block diagram 200 of a memory and file processing computing system 200 having an agent manager 202. The memory and file processing computing system 200 can be similar in many respects or the same as, the memory and file processing computing system 108 of FIG. 1. Furthermore, the agent manager 202 schematically depicted in FIG. 2 can be similar in many respects, or the same as, the agent manager module 120 of FIG. 1. The agent manager 202 can be implemented using a web server, or any other suitable combination of hardware and software. The agent manager 202 can include an application programming interface (API) 204 to facilitate communication with various devices, such as computing devices 128, 130, 132 (FIG. 1), for example. An API 204 can be utilized to access the agent manager by other third-party software applications and to improve the features and functionality of the Agent Manager 202. A task orchestration service 206 can be used to manage processes and workflow between various services associated with the agent manager, such as a vault service 208, a search results service 210, an agent task service 212, a custodian service 214, and a registration service 216. One or more services can communicate with a database access service 218 which, in turn, communicates with various databases. Example databases can include, for example, an authentication database 222 for storing credentials and access information for various users, a file system 224 for storing collected memory and file data, and one or more investigation databases 222. The investigation databases 222 can store data relevant to various investigations in which e-discovery is being conducted or malware is being identified.

Figure 3A:
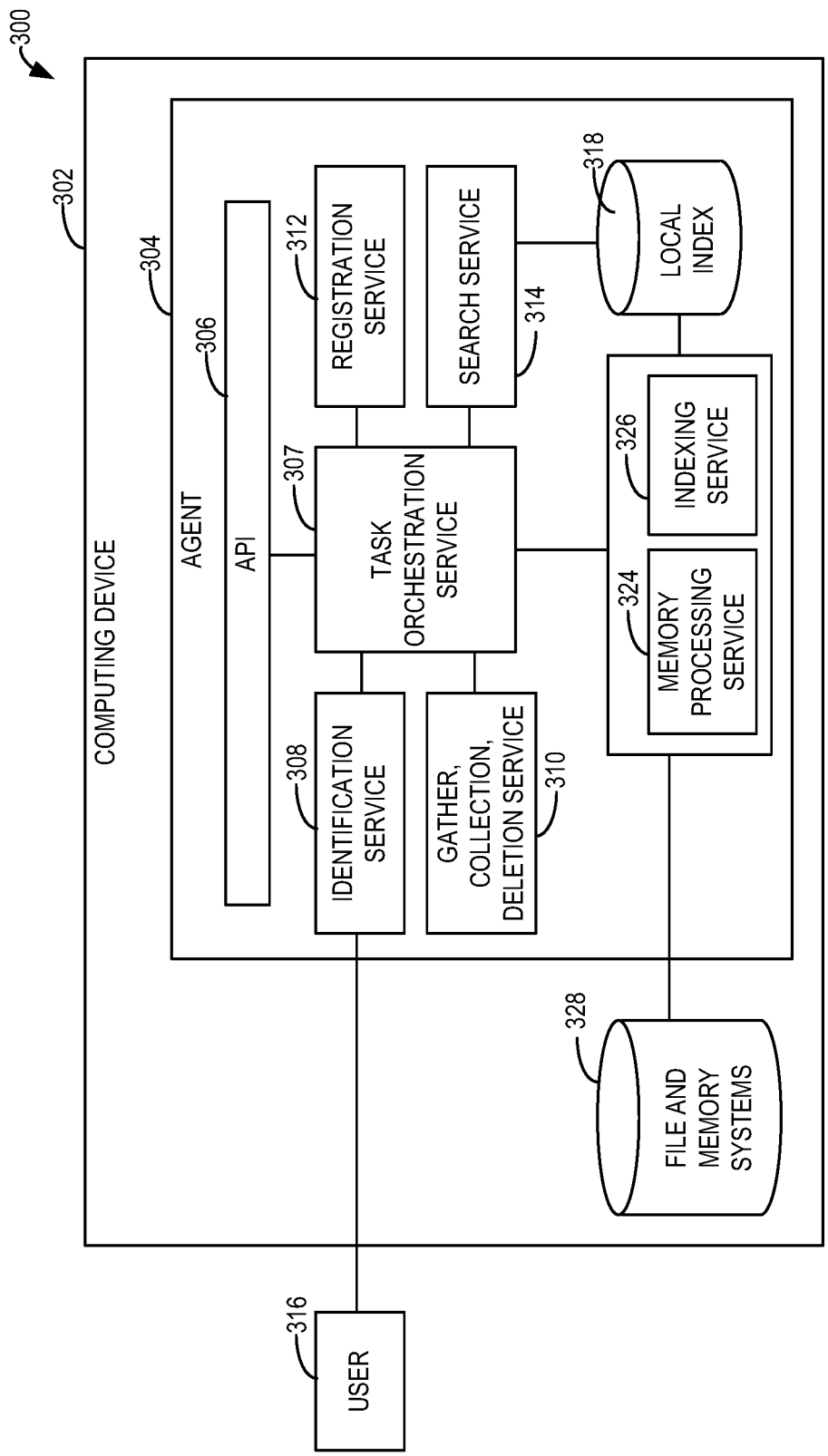
FIG. 3A depicts an example block diagram of a computing device having an agent locally installed in its memory.

FIG. 3A depicts an example block diagram 300 of a computing device 302 having an agent 304 installed in its memory (i.e., locally installed). As described above, in some embodiments, the agent 304 can be executed as a service and function generally transparently to a user 316 of the computing device 302. The agent 304 can include an API 306 to facilitate communication with various devices, such as a memory and file processing computing system. A task orchestration service 307 can be used to manage processes and workflow between various services associated with the agent, such as an identification service 308, a collection/deletion service 310, a registration service 312, and a search service 314. A task orchestration service 307 can also manage a file crawler service 320, a file processing service 324, and an indexing service 326, which function to index memory and file data stored within the file and memory systems 328 of the computing device 302. A full text index 318 can be created, and updated, by the agent 304 for access by the search service 314. The full file, memory and text index 318 can be updated periodically, based on a manual update request, or based on certain trigger events, for example. The collection and/or deletion service 310 can assist with generating copies of the identified memory and file data for transmission to the memory and file processing computing system or for the deletion of files and memory from the computing device 302. The registration service 312 can assist with the registering the agent 304 and the associated computing device 302 with the memory and file processing computing system. Registration can include, for example, providing the memory and file processing computing system with an IP address of the computing device 302, an agent identifier including deployment type (e.g. hardware, software, firmware, etc.) 304, known user 316 or users or other registration information. The search service 314 can facilitate the searching of the index 318 when a query is received from the memory and file processing computing system. The agent 304 indexes ESI content and meta data when an endpoint computing device is in a "live" state, powered on and can resume where left off if the endpoint computing device returns to its live state from a powered off state.

Figure 3B:
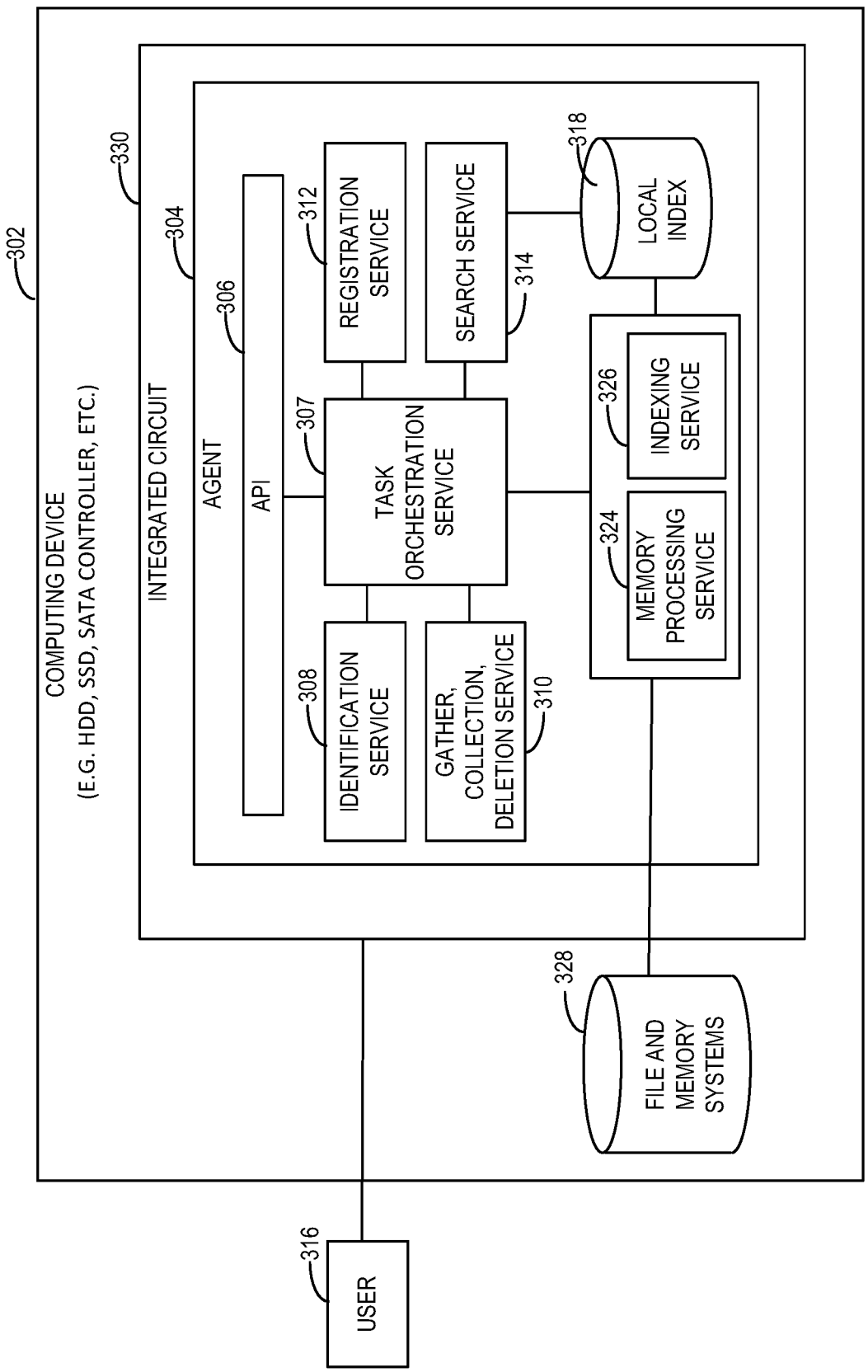
FIGS. 3B-3C depict example block diagram of computing device having agents embedded in an integrated circuit.
Figure 3C:
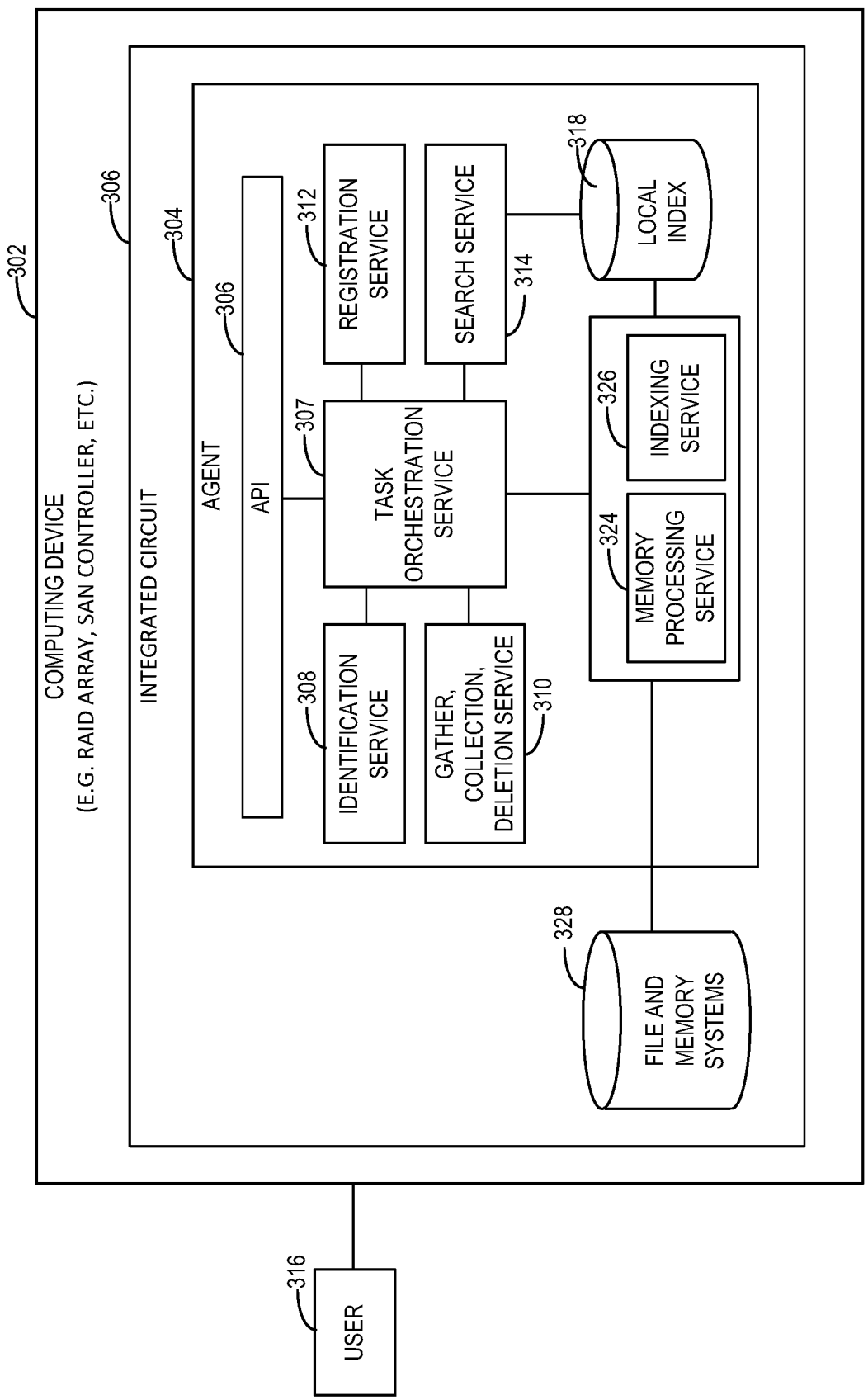

The computing device 302 depicted in FIG. 3B can be any of a variety of endpoint devices, such as a solid state drives, hard disk drives, storage controllers (i.e. SATA/PCIe/RAID, etc.), network-attached storage (NAS), storage area network (SAN) solutions, etc. In some embodiments, the agent 304 is deployed in permanent software programmed into read-only memory of the computing device 302 (i.e., firmware). The computing device 302 FIG. 3C depicts a variety of other computing devices, such as a RAID array, a SAN controller, and so forth. As depicted in FIGS. 3B-3C, the agent 304 is depicted as being embedded in an integrated circuit 330.

Figure 4:
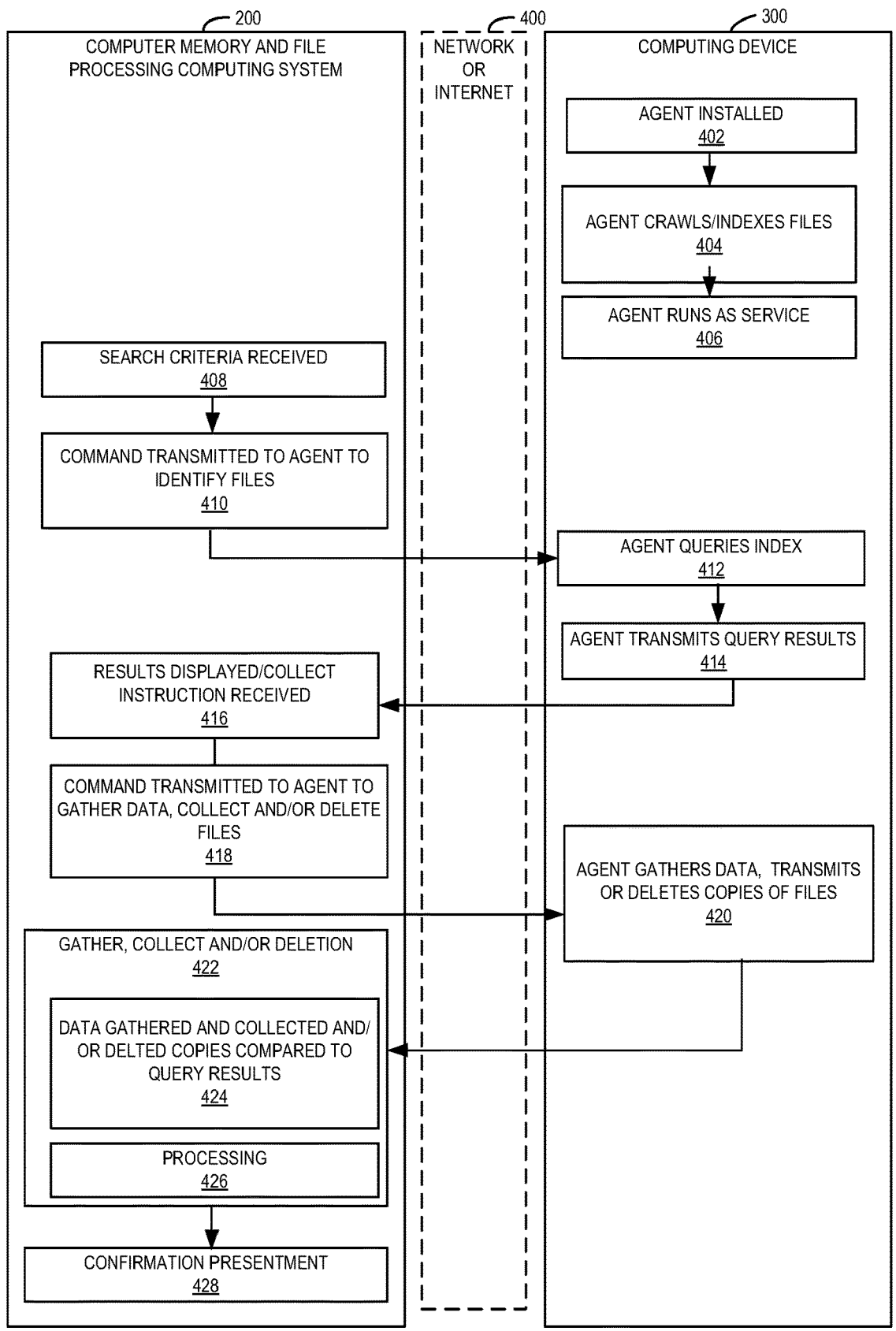
FIG. 4 is process flow chart depicting an example interaction between the memory and file processing computing system of FIG. 2 and the computing device of FIG. 3A.

FIG. 4 is process flow chart depicting an example interaction between the memory and file processing computing system 200 of FIG. 2 and the computing device 300 of FIG. 3A. A network 400, such as the Internet, a local area network or a wide area network, can be used to facilitate communication between the memory and file processing computing system 202 and the computing device 302. Referring now to FIGS. 2-4, at 402 (FIG. 4), the agent 204 is installed in the computing device 300. At 404, the file system and all of its contents 328 of the computing device 300 is crawled by the agent 304 and an index 318 is generated. As indicated at 406, the agent 304 executes locally on the computing device 300 as a service and awaits further instruction from the memory and file processing computing system 200.

At 408 of FIG. 4, search criteria are received. Such search criteria can be received from a user of the memory and file processing computing system 200, such as a credential user 102 (FIG. 1). At 410, a command is transmitted to the agent 304 to identify memory and file data satisfying the search criteria. At 412, the search service 314 of the agent 304 queries the index 318. At 414, the agent 304 transmits the query results to the memory and file processing computing system 200. In one embodiment, the query results are transmitted as total number of "matches," which can be reported in a plethora of ways which are described below. At 416, the query results are displayed for consideration by the user 102. At 418, a collect or delete command can be transmitted to the agent 304 to collect or delete the identified memory or files. At 420, the collection/deletion service 310 of the agent 304 collects or deletes the identified files and transmits copies or reports of the delete confirmation of the files to the memory and file processing computing system 200.

At 422, collection of the identified memory and file data is performed at the memory and file processing computing system 200. Collection can include on-the-fly processing of the collected memory and file data, including a comparison of the collected copies to the query results (at 424) and other processing (i.e., de-duplication, etc.) at 426. At 428, the collected files are presented to a user of the memory and file processing computing system 200. Such presentment can be facilitated through a graphical user interface, as described in more detail below.

Figure 5:
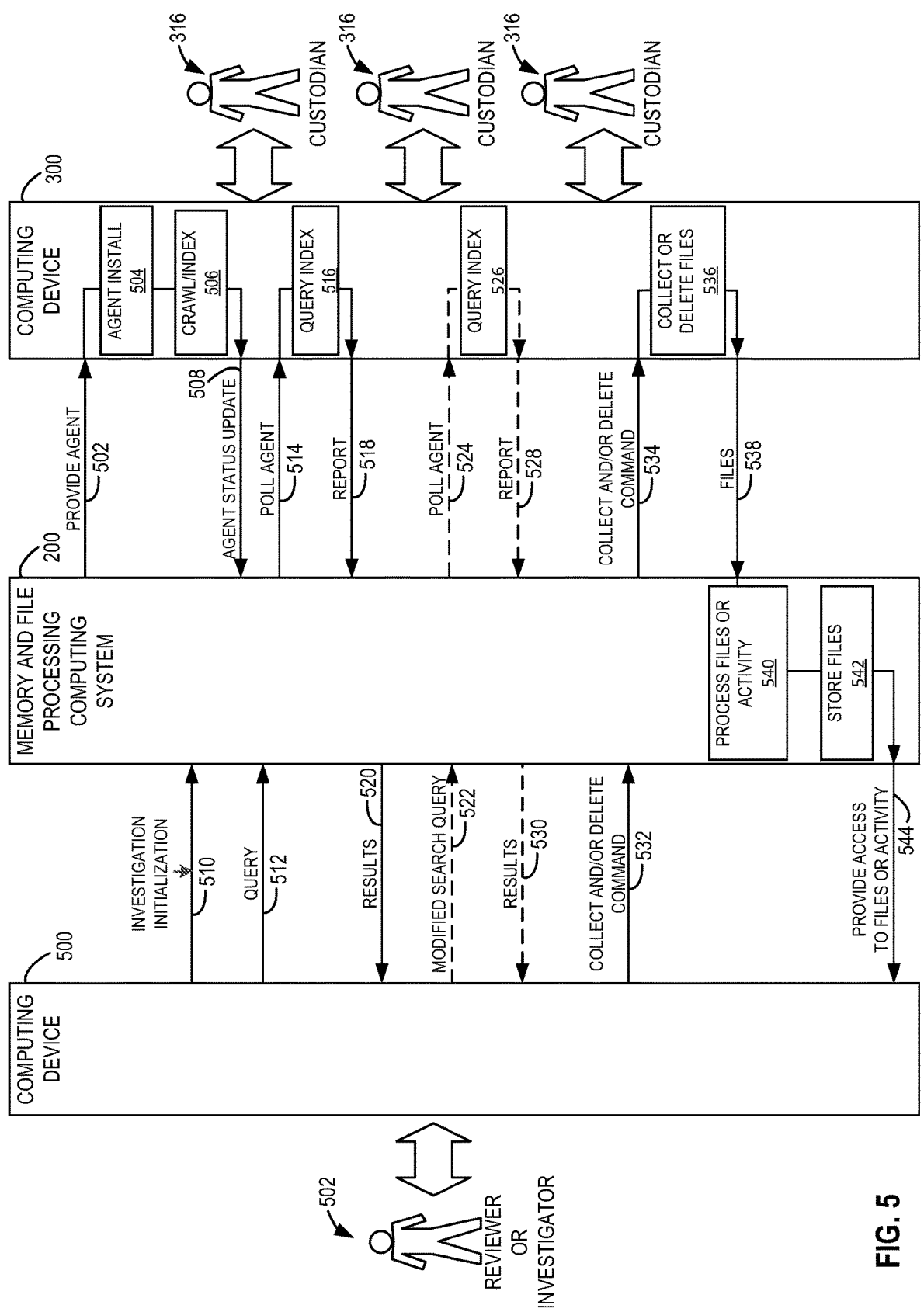
FIG. 5 depicts a message sequence chart illustrating example messaging between a computing device and a reviewer or investigator, the memory and file processing computing system of FIG. 2, and the computing device of FIG. 3A.

FIG. 5 depicts a message sequence chart illustrating example messaging between a computing device 500 of a reviewer or investigator 502, the memory and file processing computing system 200 of FIG. 2, and the computing device 300 of FIG. 3A having an agent 304 installed thereon. At 502, an agent is provided to the computing device 300. While the agent is shown in FIG. 5 as being received by the computing device 300 from the memory and file processing computing system 200, in other embodiments, the agent can be received from other suitable sources. In any event, at 504, the agent is installed and (at 506) the agent crawls and indexes the files and memory of the computing device 300. At 508, the agent provides a message to the memory and file processing computing system 200 indicating the index is complete. An investigation initialization message is received by the memory and file processing computing system 200 from the computing device 500 at 510. The investigation initialization message can identify certain parameters which can be stored in an investigation database 220 (FIG. 2). At 512, a query is received from the computing device 500. The memory and file processing computing system 200 can poll the agent at 514. As is to be appreciated, depending on the number of computing devices associated with the investigation, the memory and file processing computing system 200 can query a plurality of agents in response to receiving a query.

At 516, the agent of the computing device 300 queries the index to identify any memory and file data relevant to the query. At 518, a report is provided by the agent to the memory and file processing computing system 200 indicating the identified data. The memory and file processing computing system 200 then provides the results to the computing device 500. The results can be in any suitable format, such as the number of documents satisfying the query, the total file size of the documents satisfying the query, and so forth. If desired (i.e. too many or too few files were identified), the reviewer or investigator can submit a modified query 522 to expand or reduce the search. The agent(s) can be polled at 524 based on the revised query, with a new report provided to the memory and file processing computing system 200 at 528. At 530 results of the revised query are delivered to the computing device 500 by the memory and file processing computing system 200. At 532, a collect and/or delete command can be received by the memory and file processing computing system 200 from the computing device 500. At 524, a collect and/or delete command is dispatched to the agent(s). At 536 and 528, the memory and/or files are collected and/or deleted and the results transmitted to the memory and file processing computing system 200. The time period for completion of the collection and/or deletion process will depend on a number of factors, such as the total number of memory or files being collected and/or deleted, the total number of computing devices supplying the resultant data, the speed of the network connection, and whether the computing devices are online at the time the collection and/or delete command was dispatched. In some embodiments, the time period for completion of the process can be less than about 5 minutes. In some embodiments, the time period for completion of the process can be less than about 2 days. In some embodiments, the time period for completion of the process can be less than about 1 day. In some embodiments, the time period for completion of the process can be less than about 5 days. In some embodiments, the time period for completion of the process can be less than about 1 month.

The memory and file processing computing system 200 then processes the files at 540 and stores the files at 542. At 544, access is provided to the files to the reviewer or investigator 502. The reviewer or investigator can then perform additional searching on the collected files to identify particular subsets of the collected files, or can simply serially review all of the files received in response to the collection command.

Figure 6:
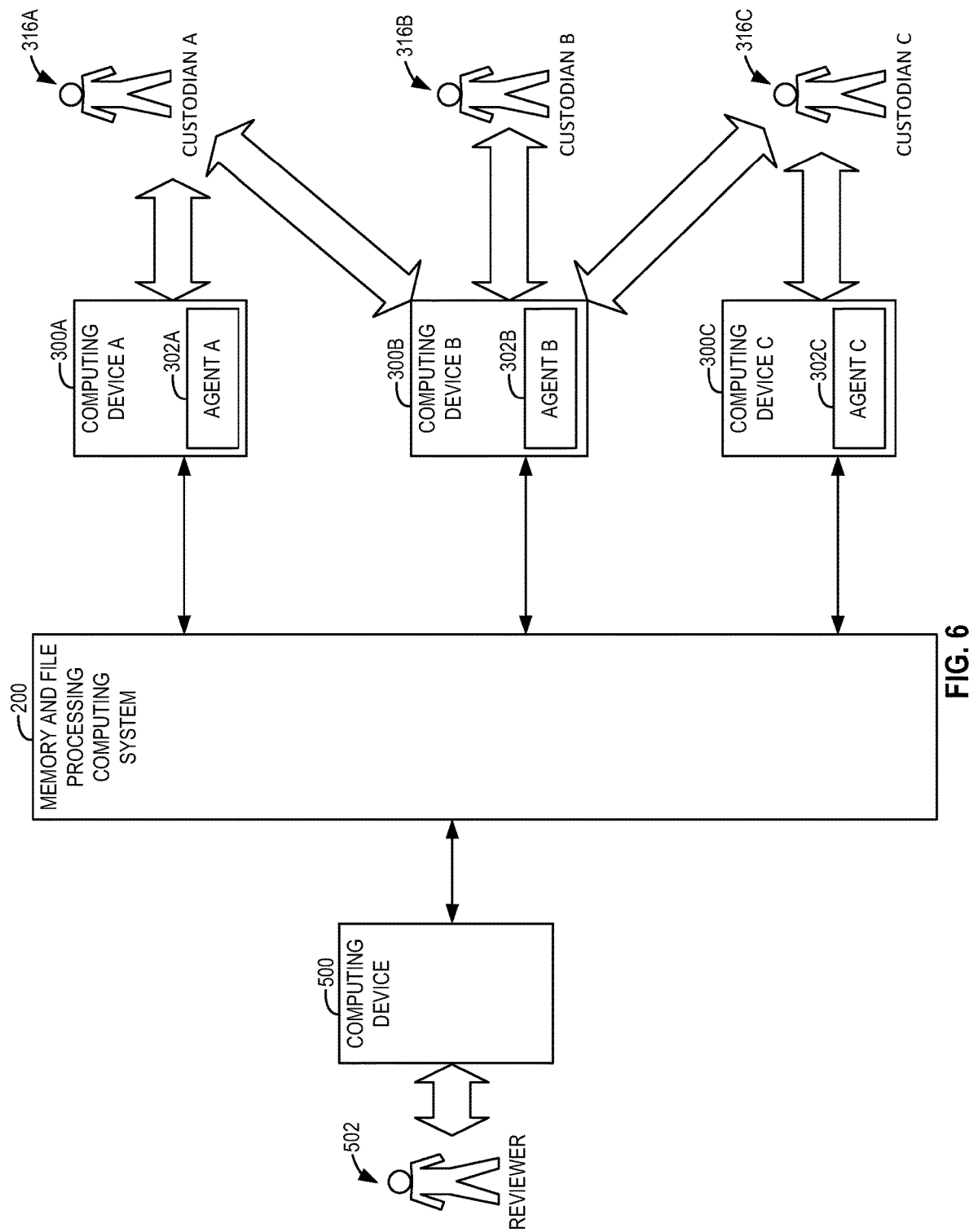
FIG. 6 is a block diagram depicting communications between the computing device of FIG. 5, the memory and file processing computing system of FIG. 2, and a plurality of computing devices.

FIG. 6 is a block diagram depicting communications between the computing device 500 of FIG. 5, the memory and file processing computing system 200 of FIG. 2, and a plurality of computing devices 300A-C, each having an agent installed thereon (shown as agents 302A, 302B, 302C). As illustrated, custodian 316A interacts with and generates files on computing device 300A, custodian 316B interacts with and generates files on computing device 300B, and custodian 316C interacts with and generates files on computing device 300C. However, custodian 316A also logs into and generates files on computing device 300B and custodian 316C also logs into and generates files on computing device 300B. Accordingly, all of the memory and file data stored on the computing device 300B is not necessarily created by custodian 316B. Such a distinction could be considered important in a litigation context, or for who might be responsible for how malware was introduced onto the computing device, for example. The systems, apparatuses, devices, and methods can facilitate the tracking and linking of specific memory and files to specific custodians. In some embodiments, metadata associated with files (i.e., the "file owner" metadata assigned by the operating system of the computing device) can be used by the memory and file processing computing system 200 and/or agent to identify particular custodians to particular memory and file data. By way of example, if the reviewer or investigator 502 submitted a query seeking to locate documents generated by custodian A, that contain certain keywords, and were created within a certain date range, or contain a specific hash, the memory and file processing computing system 200 will be able to not only identify documents on custodian A's machine that satisfy the search criteria, but also documents on any other machine to which custodian A logged onto and generated files (i.e. computing device B).

Figure 7:
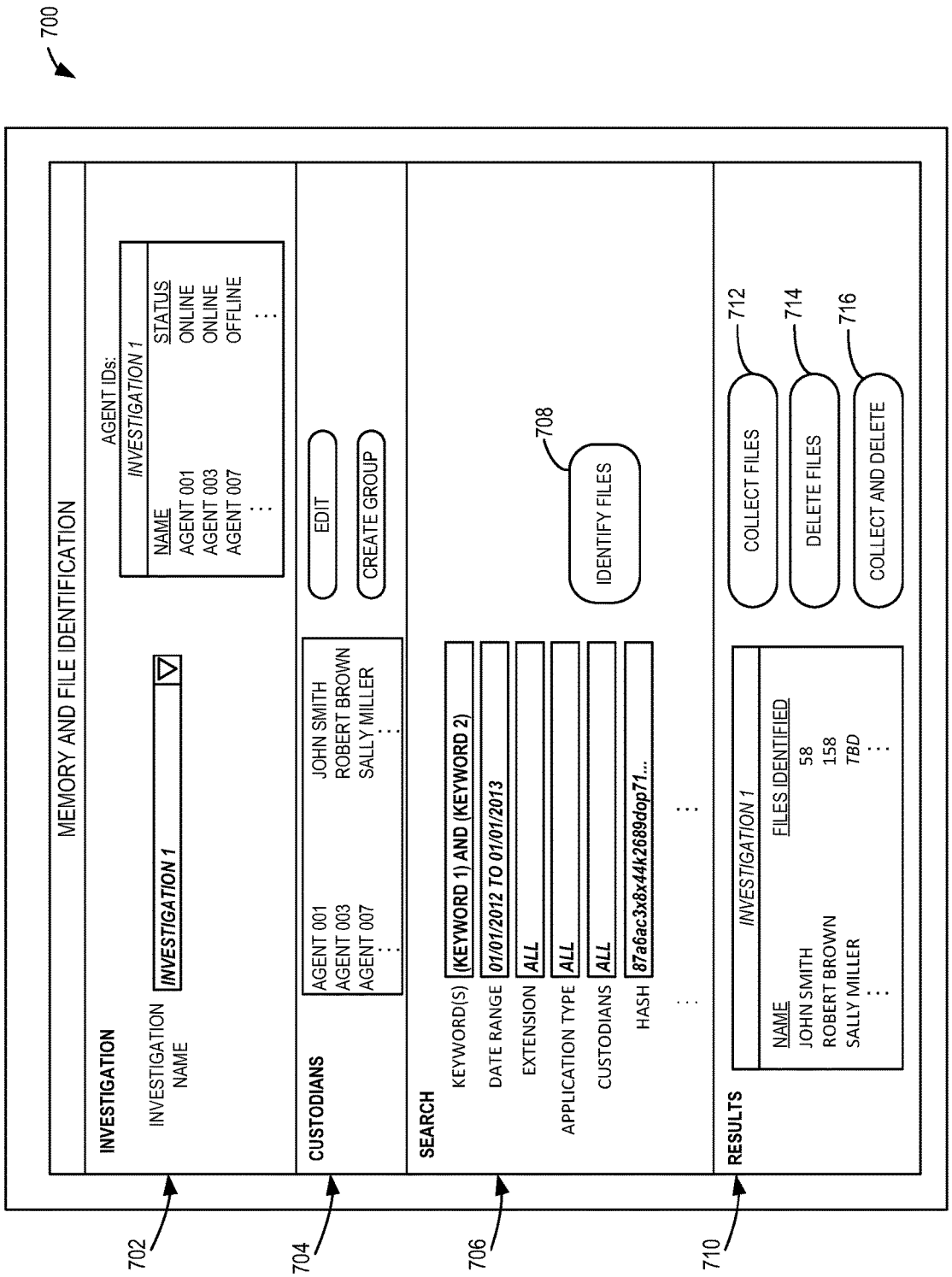
FIGS. 7-8 depict example graphical user interfaces.

FIG. 7 depicts an example simplified graphical user interface 700 that can be presented on a display of a computing device of an reviewer or investigator and hosted by a memory and file processing computing system. The graphical user interface 700 can be presented using hypertext markup language (HTML) and Java scripts, or a dedicated applet or application, or any other suitable interfacing means as would be known or understood in the art. The reviewer or investigator can be presented with a variety of management tools or options associated with searching and identifying relevant memory and file data. In the illustrated embodiment, the options are presented as selectable graphical elements or icons. The example graphical user interface 700 includes an investigation selection portion 702 for receiving a selection from the reviewer or investigator. As illustrated, the particular agents associated with a particular investigation can be displayed to the reviewer or investigator, along with a status for the agent.

The example graphical user interface 700 also includes a custodian portion 704 that allows the agents to be tied to a particular user. Additional functionality can be provided to aid in searching. For example, various groups of custodians/agents (i.e., "marketing department", "executives") can be created. A search portion 706 allows for the reviewer or investigator to provide search criteria. As is to be readily appreciated, the particular layout and/or functionality of the search portion 706 may vary. Once the reviewer or investigator is satisfied with the search terms, the "identify files" icon 708 can be activated to cause the memory and file processing computing system to poll the relevant agents. The results from the polling can be displayed in a results portion 710. In the illustrated embodiment, the results portion 710 delineates the identified memory or data by custodian. If one or more of the agents are offline, the results for that custodian are indicated as "TBD." If the reviewer or investigator is satisfied with the results (i.e., the total number of memory and files identified), the "collect files" icon 712 or the "delete files" icon 714 or the "collect and delete" icon can be activated to cause the memory and file processing computing system to gather copies of identified memory and data from the various computing devices and/or delete them.

Figure 8:
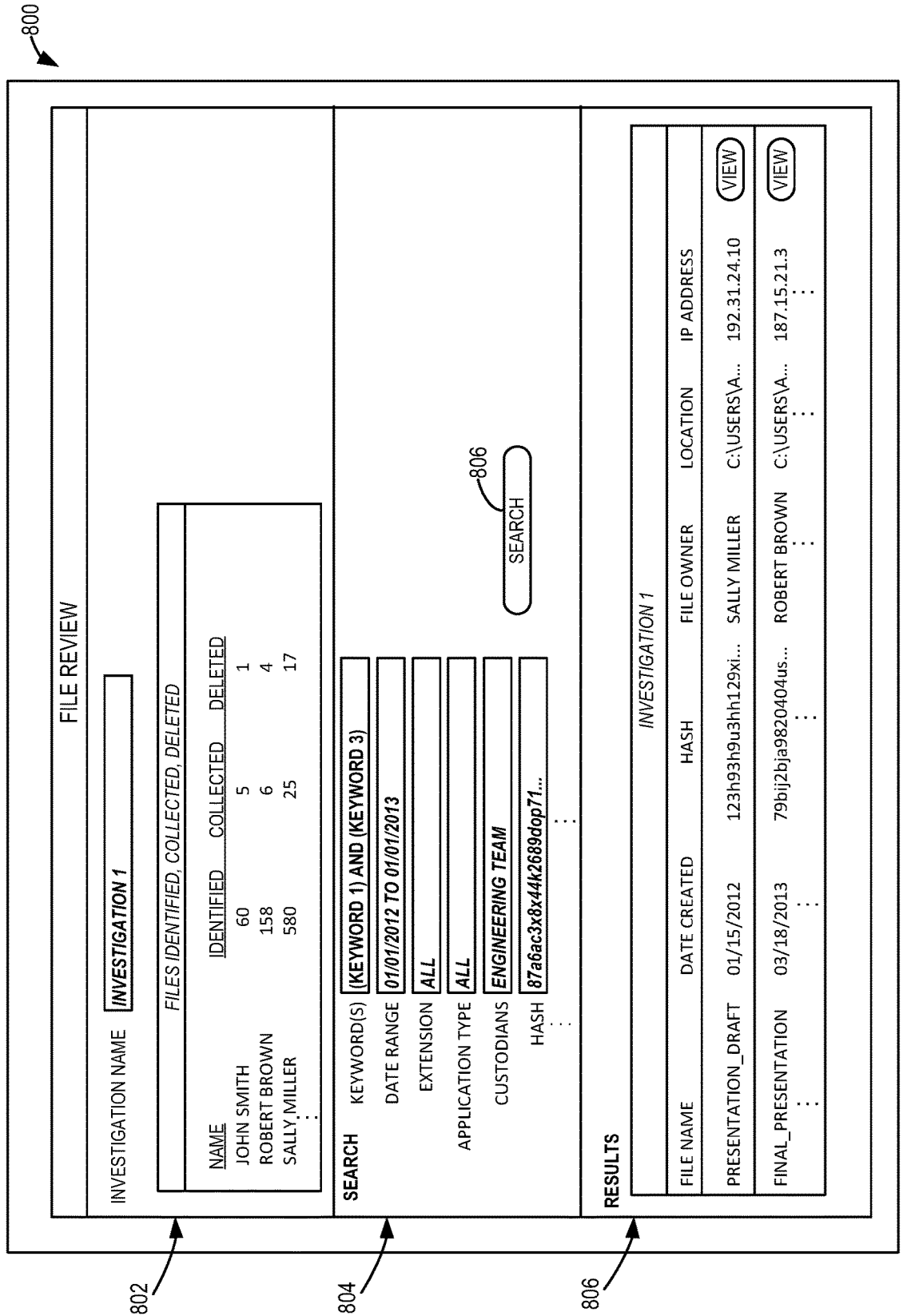

FIG. 8 depicts an example of another simplified graphical user interface 800 that can be presented on a display of a computing device of a reviewer or investigator and hosted by a memory and file processing computing system. This graphical user interface 800 can be used by the reviewer or investigator to review the collected memory and file data. Accordingly, the graphical user interface 800 can include a summary portion 802. The collection summary portion 802 can identify the number of files (or other type of memory or file data) collected from various custodians. A search portion 804 allows the reviewer or investigator to submit searches to identify subsets of identified memory or file data. Example search parameters can include keywords, data ranges, file extensions, application types, custodians, cryptographic hash and so forth. Upon activation of the "search" icon 806, the memory and file data can be searched to identify memory or file data satisfying the search terms with the results then presented in the results portion 806.

Figure 9:
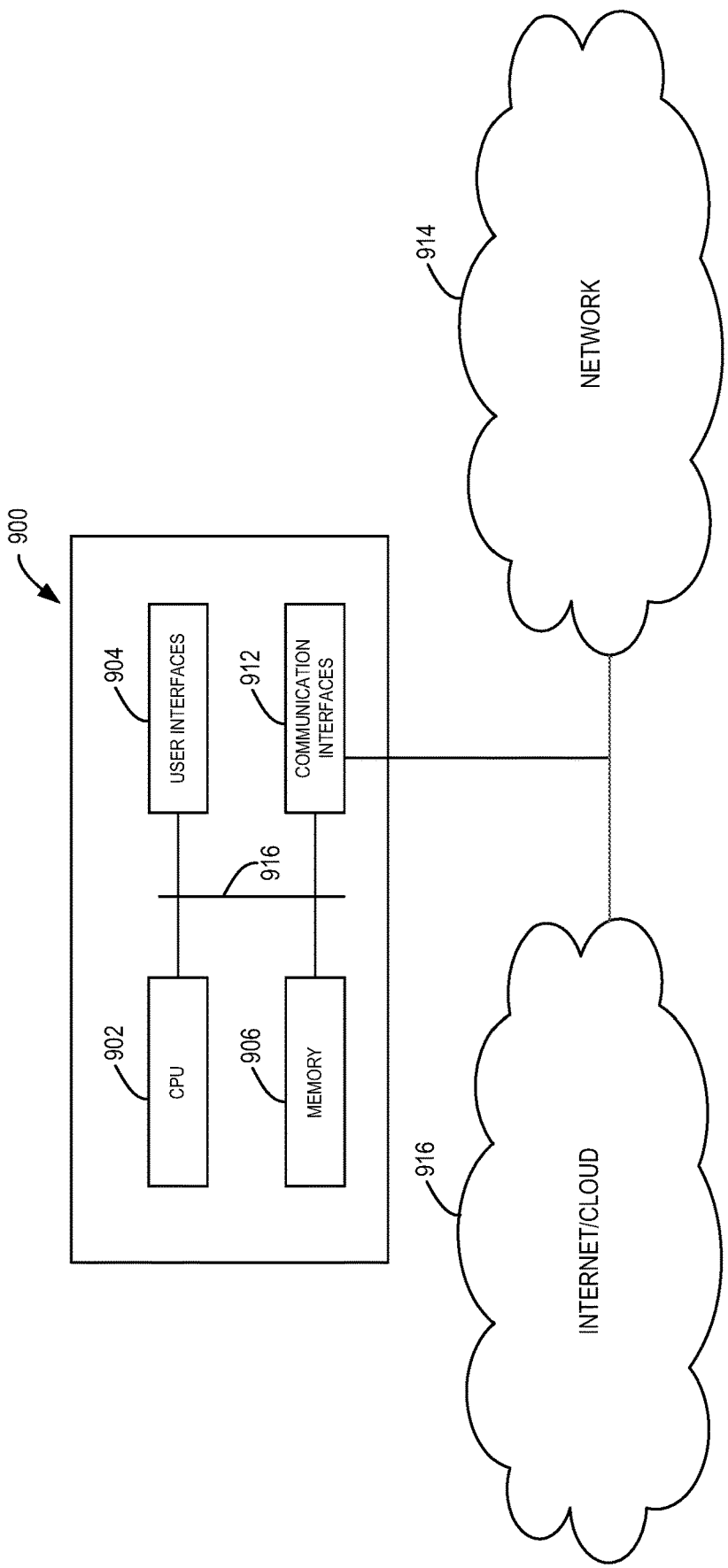
FIG. 9 schematically depicts a computing device.

The processes described herein can be performed on or between one or more computing devices. Referring now to FIG. 9, an example computing device 900 is presented. A computing device 900 can be a server, a computing device that is integrated with other systems or subsystems, external and detachable hard drive, storage array, a mobile computing device, a cloud-based computing capability, and so forth. The computing device 900 can be any suitable computing device as would be understood in the art, including without limitation, a custom chip, an embedded processing device, a tablet computing device, a personal data assistant (PDA), a desktop, a laptop, a microcomputer, a minicomputer, a server, a mainframe, a computing device 104, 128, 130, 132, 302, 500 a memory and file processing computing system 108, hard drive, solid state drive, storage systems or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

The computing device 900 includes a processor 902 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 900 also includes one or more memories 906, for example read only memory (ROM), random access memory (RAM), cache memory associated with the processor 902, or other memories such as dynamic RAM (DRAM), static ram (SRAM), programmable ROM (PROM), electrically erasable PROM (EEPROM), flash memory, a removable memory card or disk, a solid state drive, and so forth. The computing device 900 also includes storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor 902, or memories 906 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 912 can be configured to transmit to, or receive data from, other computing devices 900 across a network 914 or the Internet 916. The network and communication interfaces 912 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 912 can include wired data transmission links such as IEEE 802.3 Ethernet, as well as the TCP/IP suite of protocols, including both IPv4 and IPv6, as well as subsequent IP based networking technologies. The communication interfaces 912 can include wireless protocols for interfacing with private or public networks 914. For example, the network and communication interfaces 912 and protocols can include interfaces for communicating with private wireless networks such as a WiFi network, one of the IEEE 802.11x family of networks, or another suitable wireless network. The network and communication interfaces 912 can include interfaces and protocols for communicating with public wireless networks 912, using for example wireless protocols used by cellular network providers, including Code Division Multiple Access (CDMA) and Global System for Mobile Communications (GSM). A computing device 900 can use network and communication interfaces 912 to communicate with hardware modules such as a database or data store, or one or more servers or other networked computing resources. Data can be encrypted or protected from unauthorized access.

In various configurations, the computing device 900 can include a system bus 916 for interconnecting the various components of the computing device 900, or the computing device 900 can be integrated into one or more chips such as programmable logic device or application specific integrated circuit (ASIC). The system bus 916 can include a memory controller, a local bus, or a peripheral bus for supporting input and output devices 904, and communication interfaces 912. Example input and output devices 904 include keyboards, keypads, gesture or graphical input devices, motion input devices, mechanical switches, relays, motors, stack lights, infrastructure, architecture and security management systems, touchscreen interfaces, one or more displays, audio units, voice recognition units, vibratory devices, computer mice, and any other suitable user interface.

The processor 902 and memory 906 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein. Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A non-transitory computer-readable medium may also include memory storage that may be physical, virtual, permanent, temporary, semi-permanent and/or semi-temporary.

These and other embodiments of the systems and methods can be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

What is claimed is:

1. A system, comprising:
a processor and a memory coupled to the processor, wherein the processor is in networked communication with each of a plurality of remotely located endpoint computing devices via an agent embedded in each of the endpoint computing devices, wherein each of the endpoint computing devices in is any of a storage controller and a storage device, each of the plurality of endpoint computing devices having an index of the entire storage content of the endpoint computing device, wherein the entire storage content comprises structured, semi-structured, and unstructured electronically stored information resident on the endpoint computing device, wherein the index is generated and managed by the agent, and wherein the index of the entire storage content of the endpoint computing device generated and managed by the agent is locally stored at the endpoint computing device, and wherein the processor is configured to:
receive a search query from a centralized user, wherein the search query identifies an element of interest;
for each of the plurality of endpoint computing devices that are online at the time the search query is received from the centralized user, communicate the search query to the agent embedded in each of the plurality of online endpoint computing devices;
for each of the plurality of endpoint computing devices that are offline at the time of search query is received from the centralized user, queue the search query for transmission to each of the plurality of offline endpoint computing devices at a later point in time;
subsequent to the agent embedded in each of the plurality of online endpoint computing devices querying the respective index of structured, semi-structured, and unstructured electronically stored information resident on the respective endpoint computing device for the element of interest of the search query, receive responses from one or more agents indicative of the query results; and
display to the centralized user an identification of the query results received from the one or more of the agents, wherein the query results identify the one or more endpoint computing devices storing the element of interest based on the querying of the index of structured, semi-structured, and unstructured electronically stored information generated by the agent embedded in the respective endpoint computing device;
wherein the index of the entire storage content of the endpoint computing device generated and managed by the agent is locally stored at the endpoint computing device.

2. The system of claim 1, wherein the processor is further configured to:
subsequent to displaying to the centralized user the identification of the query results received from one or more of the agents, receive a selection from the centralized user of one or more of the query results for retrieval;
communicate the selection to the one or more agents; and
receive from the one or more agents a copy of the element of interest.

3. The system of claim 2, wherein the processor is further configured to:
subsequent to receiving from the one or more agents the copy of the element of interest, compare the copy of the element of interest to the selection of the one or more of the query results to confirm receipt of the selected query results.

4. The system of claim 1, wherein the processor is further configured to:
subsequent to displaying to the centralized user the identification of the query results received from one or more of the agents, receive a selection from the centralized user of one or more of the query results for retrieval and deletion;
communicate the selection to the one or more agents; and
receive from the one or more agents a copy of the element of interest.

5. The system of claim 1, wherein the processor is further configured to:
subsequent to displaying to the centralized user the identification of the query results received from one or more of the agents, receive a selection from the centralized user of one or more of the query results for deletion at the endpoint computing device;
communicate the selection to the one or more agents.

6. The system of claim 1, wherein the processor is further configured to:
subsequent to displaying to the centralized user the identification of the query results received from one or more of the agents, receive a selection from the centralized user of one or more of the query results and a command to
lock the selected file at the endpoint computing device, or
fully or partially delete file contends and replace with text;
communicate the selection to the one or more agents.

7. The system of claim 1, wherein at least one endpoint computing device is any of a solid state drive, hard disk drive, a network-attached storage (NAS), and a storage area network (SAN) solutions.

8. The system of claim 1, wherein the element of interest is any of a cryptographic hash, a keyword, a user name, a custodian, a credit card number, a social security number, a file name, file contents, custom strings, a file size, a file type, and a creation date.

9. The system of claim 8, wherein the cryptographic hash is a cryptographic hash associated with specified content.

10. The system of claim 8, wherein the cryptographic hash is a cryptographic hash associated with malicious software.

11. The system of claim 1, wherein the processor is in networked communication with each of the plurality of remotely located endpoint computing devices over a public communications network.

12. The system of claim 1, wherein the processor is in networked communication with each of the plurality of remotely located endpoint computing devices over a private communications network.

13. The system of claim 1, wherein the index of the entire storage content of the endpoint computing device generated and managed by the agent is a full text and metadata index.

14. The system of claim 1, wherein the index of the entire storage content of the endpoint computing device generated and managed by the agent is of full or partial storage device contents.

15. The system of claim 1, further comprising the plurality of remotely located endpoint computing devices.

16. A method of identifying elements of interest on endpoint computing devices, comprising:
electronically communicating with agents embedded in each of a plurality of remotely located endpoint computing devices to each generate and manage an index of the entire storage content of the endpoint computing device, wherein the entire storage content comprises structured, semi-structured, and unstructured electronically stored information resident on the endpoint computing device and wherein the index of the entire storage content of the endpoint computing device generated and managed by the agent is locally stored at the endpoint computing device;
receiving a search query from a user via a user interface, wherein the search query identifies an element of interest;
for each of the plurality of endpoint computing devices that are online at the time the search query is received from the user, communicating the search query to the agent embedded in each of the plurality of online endpoint computing devices;
for each of the plurality of endpoint computing devices that are offline at the time the search query is received from the user, queuing the search query for transmission to each of the plurality of offline endpoint computing devices at a later point in time;
subsequent to the agent embedded in each of the plurality of online endpoint computing devices querying the respective index of structured, semi-structured, and unstructured electronically stored information resident on each of the respective endpoint computing devices for the element of interest of the search query, receiving responses from one or more agents indicative of the query results; and
displaying to the centralized user via the user interface an identification of the query results received from one or more of the agents, wherein the query results identify the one or more endpoint computing devices storing the element of interest based on the querying of the index generated by the agent embedded in the respective endpoint computing device.

17. The method of claim 16, wherein the element of interest is any of a cryptographic hash, a keyword, a user name, a custodian, a credit card number, a social security number, a file name, file contents, custom strings, a file size, a file type, and a creation date.

18. A system, comprising:
a plurality of endpoint computing devices in communication with a communications network, each of the plurality of endpoint computing devices comprising an agent configured to generate and manage a local full text and metadata index of the entire storage content of the endpoint computing device, wherein the entire storage content of the endpoint computing device comprises structured, semi-structured, and unstructured electronically stored information, wherein the index of the entire storage content of the endpoint computing device generated and managed by the agent is locally stored at the endpoint computing device, and wherein the agent is embedded in an integrated circuit of the endpoint computing device or stored in a read only memory of the endpoint computing device;
a command console comprising a processor and a memory coupled to the processor, wherein the command console is in networked communication with each of a plurality of remotely located endpoint computing devices via the agent, wherein the processor is configured to:
receive a search query from a centralized user of the command console, wherein the search query identifies an element of interest;

for each of the plurality of endpoint computing devices that are online at the time the search query is received from the centralized user, communicate the search query to the agent of each of the plurality of online endpoint computing devices;

for each of the plurality of endpoint computing devices that are offline at the time the search query is received from the centralized user, queue the search query for transmission to each of the plurality of offline endpoint computing devices at a later point in time;

subsequent to the agent of each of the plurality of online endpoint computing devices querying the respective full text and metadata index of structured, semi-structured, and unstructured electronically stored information for each of the respective endpoint computing devices for the element of interest of the search query, receive responses from one or more agents indicative of the query results; and display to the centralized user of the command console an identification of the query results received from one or more of the agents, wherein the query results identify the one or more endpoint computing devices storing the element of interest based on the querying of the full text and metadata index of structured, semi-structured, and unstructured electronically stored information generated by the agent of the respective endpoint computing device.

19. The system of claim 18, wherein the plurality of endpoint computing devices comprises one or more of a solid state drive, a hard disk drive, a network-attached storage (NAS), and a storage area network (SAN) solution.

* * * * *

UNITED STATES PATENT AND TRADEMARK OFFICE
CERTIFICATE OF CORRECTION

PATENT NO. : 10,970,297 B2  Page 1 of 1
APPLICATION NO. : 15/013351
DATED : April 6, 2021
INVENTOR(S) : Martin Mangan, III et al.

It is certified that error appears in the above-identified patent and that said Letters Patent is hereby corrected as shown below:

In the Claims

Claim 1, Line 8, change "endpoint computing device in is any of a storage" to --endpoint computing device is any of a storage--; and Claim 6, Line 31, change "contends" to --contents--.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*